(12) United States Patent
Kawanishi et al.

(10) Patent No.: US 11,345,125 B2
(45) Date of Patent: May 31, 2022

(54) DECORATIVE SHEET, DECORATIVE MATERIAL, AND METHOD FOR PRODUCING DECORATIVE MATERIAL

(71) Applicant: TOPPAN PRINTING CO., LTD., Tokyo (JP)

(72) Inventors: Yui Kawanishi, Tokyo (JP); Hajime Harima, Tokyo (JP); Yuki Saito, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 0 days.

(21) Appl. No.: 16/988,385

(22) Filed: Aug. 7, 2020

(65) Prior Publication Data

US 2020/0368994 A1 Nov. 26, 2020

Related U.S. Application Data

(63) Continuation of application No. PCT/JP2019/006513, filed on Feb. 21, 2019.

(30) Foreign Application Priority Data

| Feb. 23, 2018 | (JP) | JP2018-030958 |
| Oct. 25, 2018 | (JP) | JP2018-201083 |
| Feb. 19, 2019 | (JP) | JP2019-027575 |

(51) Int. Cl.
 *B32B 27/08* (2006.01)
 *B32B 7/022* (2019.01)
 (Continued)

(52) U.S. Cl.
 CPC .............. *B32B 27/08* (2013.01); *B32B 7/022* (2019.01); *B32B 27/308* (2013.01); *B32B 27/26* (2013.01);
 (Continued)

(58) Field of Classification Search
 CPC ........... B32B 3/30; B32B 27/00; B32B 27/08; B32B 27/30; B32B 27/308; B32B 7/027;
 (Continued)

(56) References Cited

U.S. PATENT DOCUMENTS

| 2007/0104928 A1* | 5/2007 | Yokochi | ............... B32B 29/005 428/204 |
| 2010/0227132 A1* | 9/2010 | Pierson | ................... B32B 27/08 428/201 |

(Continued)

FOREIGN PATENT DOCUMENTS

| JP | 06198656 | A | * | 7/1994 |
| JP | 06262729 | A | * | 9/1994 |

(Continued)

OTHER PUBLICATIONS

Machine Translation of JP H06262729 (Year: 1994).*

(Continued)

*Primary Examiner* — Laura C Powers
*Assistant Examiner* — Rebecca L Grusby
(74) *Attorney, Agent, or Firm* — Foley & Lardner LLP

(57) ABSTRACT

A decorative sheet and a method for producing the decorative material that can reduce the occurrence of adhesion failure and appearance defects, comprises an acrylic resin original member, which is an original member made of an acrylic resin, a pattern layer containing an acrylic resin as a binder and formed on a first surface of the acrylic resin original member, and an anchor layer formed on a surface of the pattern layer facing away from the acrylic resin original member.

11 Claims, 3 Drawing Sheets

(51) Int. Cl.
  *B32B 27/30* (2006.01)
  *B32B 27/26* (2006.01)
(52) U.S. Cl.
  CPC ... *B32B 2270/00* (2013.01); *B32B 2307/4023* (2013.01); *B32B 2307/412* (2013.01); *B32B 2307/718* (2013.01); *B32B 2307/732* (2013.01); *B32B 2451/00* (2013.01)
(58) Field of Classification Search
  CPC .............. B32B 7/022; B32B 2270/00; B32B 2307/4023; B32B 2307/412; B32B 2307/718; B32B 2307/732; B32B 2451/00; B32B 7/12; B32B 27/20; B32B 27/26; B32B 27/32; B32B 2250/02; B32B 2250/03; B32B 2250/05; B32B 2250/246; B32B 2255/10; B32B 2255/26; B32B 2255/28; B32B 2264/10; B32B 2264/102; B32B 2264/104; B32B 2479/00; B32B 2419/00; B32B 2605/003; B32B 2307/30; B32B 2307/402; B32B 2307/4026; B32B 2307/408; B32B 2307/50; B32B 2307/746; B32B 2307/748
  See application file for complete search history.

(56) References Cited

U.S. PATENT DOCUMENTS

| | | | | |
|---|---|---|---|---|
| 2010/0310887 A1* | 12/2010 | Kim | ................ | B44C 5/0407 428/426 |
| 2017/0297307 A1* | 10/2017 | Shinmyo | ................ | E04B 1/942 |
| 2019/0291392 A1* | 9/2019 | Inomata | ................ | B32B 27/304 |

FOREIGN PATENT DOCUMENTS

| | | | | |
|---|---|---|---|---|
| JP | 2000-301681 A | | 10/2000 | |
| JP | 2001162758 A | * | 6/2001 | |
| JP | 2007301903 A | * | 11/2007 | |
| JP | 2008-307746 A | | 12/2008 | |
| JP | 2011207019 A | * | 10/2011 | |
| JP | 2012-131112 A | | 7/2012 | |
| JP | 2015-193244 A | | 11/2015 | |
| JP | 2015193211 A | * | 11/2015 | |
| JP | 2015-214060 A | | 12/2015 | |
| JP | 2016190436 A | * | 11/2016 | |
| JP | 2017177729 A | * | 10/2017 | |
| JP | 2018-058218 A | | 4/2018 | |
| WO | WO-2011029637 A1 | * | 3/2011 | .......... E04F 13/0871 |
| WO | WO-2016120912 A1 | * | 8/2016 | ............. B32B 27/30 |
| WO | WO-2016203305 A1 | * | 12/2016 | ............. B32B 27/00 |

OTHER PUBLICATIONS

Machine Translation of WO 2016-203305 (Year: 2016).*
Machine Translation of JP 2015-193211 (Year: 2015).*
Machine Translation of JP 2011-207019 (Year: 2011).*
Machine Translation of JP 2018-058218 (Year: 2018).*
Machine Translation of JP 2015-214060 (Year: 2015).*
Machine Translation of JP 2017-177729 (Year: 2017).*
Machine Translation of JP 2016-190436 (Year: 2016).*
Machine Translation of JP 2007-301903 (Year: 2007).*
Machine Translation of JP H06198656 via EPO (Year: 1994).*
Machine Translation of WO 2016/120912 via EPO (Year: 2016).*
Ljevak, Ivana. "The variability of dynamic coefficient of friction material in flexible packaging" doi:10.25027/agj2017.28.v29i1.153 (Year: 2018).*
Machine Translation of JP 2001-162758 via EPO (Year: 2001).*
International Searching Authority, "International Search Report," issued in connection with International Patent Application No. PCT/JP2019/006513, dated Apr. 23, 2019.
International Searching Authority, "Written Opinion," issued in connection with International Patent Application No. PCT/JP2019/006513, dated Apr. 23, 2019.
Extended European Search Report dated Mar. 2, 2021 for corresponding European Patent Application No. 19757613.5.

* cited by examiner

DECORATIVE SHEET, DECORATIVE MATERIAL, AND METHOD FOR PRODUCING DECORATIVE MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/006513, filed on Feb. 21, 2019, which is based upon and claims the benefit of priority to Japanese Patent Applications Nos. 2018-030958, filed on Feb. 23, 2018; 2018-201083, filed Oct. 25, 2018, and, 2019-027575, filed Feb. 19, 2019, the disclosures of which are all incorporated herein by reference in their entireties.

BACKGROUND

Technical Field

The present invention relates to a decorative sheet, a decorative material, and a method for producing the decorative material.

Background Art

As a method for producing a decorative material, as disclosed in PTL 1, there is a known method for producing a decorative material by thermally laminating a laminate in which a decorative sheet is sandwiched between an acrylic clear substrate as an upper base and an acrylic colored substrate as a lower base. The decorative sheet being comprised by an acrylic resin original member and a pattern layer containing an acrylic resin as a binder and formed on a first surface of the original member.

CITATION LIST

[Patent Literature] PTL 1: JP 2008-307746 A

SUMMARY OF THE INVENTION

Technical Problem

In the conventional decorative material, when a plurality of layers comprising an upper base, a decorative sheet, and a lower base are laminated with a thermal lamination machine, the upper base and the acrylic resin original member of the decorative sheet have good adhesion. Accordingly, adhesion failure and appearance defects, such as air entrainment (air voids), are less likely to occur between the upper base and the acrylic resin original member. However, the adhesion between the pattern layer of the decorative sheet and the lower base was poor (weak adhesion), and thereby problems such as adhesion failure and appearance defects have occurred between the pattern layer and the lower base.

Therefore, the present invention has been made in view of the above problem. An object of the present invention is to provide a decorative sheet, a decorative material, and a method for producing the decorative material that can reduce the occurrence of adhesion failure and appearance defects.

Solution to Problem

In order to reduce the above problems, a decorative sheet according to one embodiment of the present invention comprises an original member made of an acrylic resin (acrylic resin original member), a pattern layer containing an acrylic resin as a binder and formed on a first surface of the original member, and an anchor layer formed on a surface of the pattern layer facing away from the original member.

Advantageous Effects of the Invention

According to one embodiment of the present invention, there are provided a decorative sheet, a decorative material, and a method for producing the decorative material that can reduce the occurrence of adhesion failure and appearance defects.

DETAILED DESCRIPTION

Embodiments of the present invention will be described below with reference to the drawings. In the following description of the drawings to be referred, components identical with or similar to each other are given the same or similar reference signs. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims.

First Embodiment

A first embodiment of the present invention will be described below with reference to the drawings.

(Configuration of Decorative Sheet 10)

The configuration of a decorative sheet 10 will be described using FIG. 1.

Figure 1:
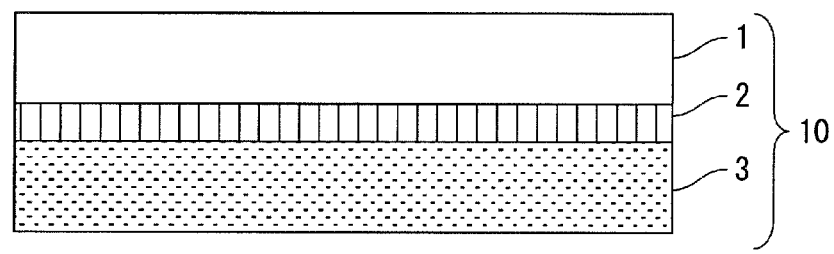
FIG. 1 is a cross-sectional view illustrating a configuration of a decorative sheet according to a first embodiment of the present invention.

As shown in FIG. 1, the decorative sheet 10 comprises an acrylic resin original member 1, a pattern layer 2, and an anchor layer 3. More specifically, the decorative sheet 10 comprises an acrylic resin original member 1, which is an original member made of an acrylic resin, a pattern layer 2 containing an acrylic resin as a binder and formed on a first surface of the acrylic resin original member 1, and an anchor layer 3 formed on a surface of the pattern layer 2 facing away from the acrylic resin original member 1.

The details of each of the above layers will be described below.

(Acrylic Resin Original Member 1)

The acrylic resin original member 1 is an original member made of an acrylic resin, and is a layer that imparts mechanical strength to the decorative sheet 10, that is, a layer that serves as a supporting medium for the decorative sheet 10.

The acrylic resin original member 1 used is, for example, a resin sheet comprising an acrylate copolymer resin as a main component. In terms of the balance with the hardness, thermal shrinkage properties, etc., of the pattern layer 2 described later, usable examples of the material of the acrylic resin original member 1 include those comprising an acrylate copolymer resin as a main component, such as an ethylene-methyl acrylate copolymer resin (EMA), an ethylene-ethyl acrylate copolymer resin (EEA), an ethylene-methacrylic acid copolymer resin (EMAA), an ethylene-acrylic acid copolymer resin (EAA), an ionomer resin, and a mixture thereof. Here, the "main component" refers to a component that is contained in the largest amount, among the components constituting the acrylic resin original member 1.

The above-described copolymer resins have an advantage in that the hardness of the sheet can be changed in any manner depending on the copolymer composition, and thus may be suitably used in the decorative sheet 10 according to the present embodiment. In particular, in consideration of the balance between the hardness and flexibility of the decorative sheet 10, it is most preferable to use an ethylene-methyl methacrylate copolymer resin (EMAA).

The thickness of the acrylic resin original member 1 is not particularly limited and may have any thickness. However, in consideration of the thickness of the entire decorative sheet 10 etc., a thickness of approximately 500 to 3000 μm is generally suitable.

The acrylic resin original member 1 suitably contains an inorganic filler in order to reduce thermal shrinkage properties. Examples of inorganic fillers include silica, alumina, calcium carbonate, barium sulfate, titanium oxide, zinc oxide, kaolin, talc, and the like. These can be used alone or as a mixture of two or more types. From the viewpoint of the effect of reducing thermal shrinkage properties, it is most desirable to use talc as a main component. The content of the inorganic filler is generally required to be at least 20 parts by mass or more per 100 parts by mass of the resin component, and is desirably appropriately designed within a range of 50 parts by mass or more and 500 parts by mass or less. When the content of the inorganic filler is within the above numerical range, the thermal shrinkage properties of the acrylic resin original member 1 can be effectively reduced.

In order to color the acrylic resin original member 1 to a desired color tone, a colorant, such as an inorganic pigment or an organic pigment, may be added. In addition, various additives, such as ultraviolet absorbers, light stabilizers, antioxidants, internal mold release agents, antistatic agents, and antibacterial agents, may be suitably added, as needed. When the decorative sheet 10 is back-printed, the acrylic resin original member 1 is preferably transparent.

(Pattern Layer 2)

The pattern layer 2 is a layer for imparting a pattern to the decorative sheet 10, and is formed on a first surface of the acrylic resin original member 1, as shown in FIG. 1.

The type of pattern design on the pattern layer 2 is not particularly limited. For example, wood grain patterns, stone grain patterns, cloth grain patterns, abstract patterns, geometric figures, characters, symbols, and the like can be used alone or in combination of two or more.

The pattern layer 2 is formed by applying an ink containing an acrylic resin as a binder (hereinafter also referred to as the "pattern layer-forming ink") to the first surface of the acrylic resin original member 1. Usable examples of the acrylic resin contained as a binder in the pattern layer-forming ink include those comprising an acrylate copolymer resin as a main component, such as an ethylene-methyl acrylate copolymer resin (EMA), an ethylene-ethyl acrylate copolymer resin (EEA), an ethylene-methacrylic acid copolymer resin (EMAA), an ethylene-acrylic acid copolymer resin (EAA), an ionomer resin, and a mixture thereof. Here, the "main component" refers to a component that is contained in the largest amount, among the components constituting the pattern layer 2.

The pattern layer-forming ink may contain, together with the above-mentioned acrylic resin, a crosslinking agent for crosslinking the acrylic resin. This crosslinking agent has the function of crosslinking the acrylic resin to impart mechanical strength to the entire pattern layer, and is thus generally also referred to as a "curing agent." Examples of crosslinking agents (curing agents) that can be added to the pattern layer-forming ink include acrylic curing agents. More specifically, examples of acrylic curing agents that can be added to the pattern layer-forming ink include IPDA (isophorone diamine) and HDI (hexamethylene diisocyanate). In the present embodiment, these can be used alone or as a mixture thereof.

When the pattern layer-forming ink contains a crosslinking agent, the content of the crosslinking agent is preferably within a range of more than 0 parts by mass and 3 parts by mass or less when the content of the acrylic resin in the pattern layer 2 is 100 parts by mass. When the content of the crosslinking agent is within the above numerical range, the coating properties of the pattern layer-forming ink are improved. The content of the crosslinking agent is preferably 3 parts by mass when the content of the acrylic resin in the pattern layer 2 is 100 parts by mass.

In addition to the above binder, the pattern layer-forming ink may suitably contain, for example, an organic or inorganic dye or pigment, and optionally an extender pigment, a filler, a tackifier, a dispersant, a defoaming agent, a stabilizer, and other additives. Further, the pattern layer-forming ink is adjusted to a desired viscosity with an appropriate diluting solvent.

The method for forming the pattern layer 2 is not particularly limited. Usable examples include any printing methods, such as a gravure printing method, an offset printing method, a screen printing method, a flexographic printing method, a relief printing method, and an inkjet printing method.

Moreover, when a solid ink layer (not shown) is provided between the acrylic resin original member 1 and the pattern layer 2 for the purpose of base coloration, usable examples of the method for forming the solid ink layer include, in addition to the various printing methods described above, any coating methods, such as a roll coating method, a gravure coating method, a rod coating method, a knife coating method, an air knife coating method, a spray coating method, a lip coating method, and a die coating method.

(Anchor Layer 3)

The anchor layer 3 is a layer for increasing the adhesion to a clear substrate made of an acrylic resin (upper base) or a colored substrate made of an acrylic resin (lower base) to such a degree that there is no problem in use, and for reducing the occurrence of appearance defects. As shown in FIG. 1, the anchor layer 3 is formed on a surface of the pattern layer 2 facing away from the acrylic resin original member 1.

The anchor layer 3 is formed by applying an ink containing an acrylic resin (hereinafter also referred to as the "anchor layer-forming ink") to a surface of the pattern layer 2 facing away from the acrylic resin original member 1.

The coating amount (formation amount) of the anchor layer 3 is preferably within a range of 0.5 g/m$^2$ or more and 2.0 g/m$^2$ or less. When the coating amount of the anchor layer 3 is within the above numerical range, it is possible to increase the adhesion between the anchor layer 3 and the acrylic clear substrate as the upper base or the acrylic colored substrate as the lower base to such a degree that there is no problem in use, and to reduce the occurrence of appearance defects.

Usable examples of the acrylic resin contained in the anchor layer-forming ink include those comprising an acrylate copolymer resin as a main component, such as an ethylene-methyl acrylate copolymer resin (EMA), an ethylene-ethyl acrylate copolymer resin (EEA), an ethylene-methacrylic acid copolymer resin (EMAA), an ethylene-acrylic acid copolymer resin (EAA), an ionomer resin, and a mixture thereof. Here, the "main component" refers to a component that is contained in the largest amount, among the components constituting the anchor layer 3.

Further, the glass transition temperature (Tg) of the acrylic resin contained in the anchor layer 3 is preferably within a range of 90° C. or more and 100° C. or less. If the glass transition temperature of the acrylic resin contained in the anchor layer 3 is within the above numerical range, when the decorative sheet 10 is thermally laminated, the entire anchor layer 3 is appropriately softened, and the adhesion to the clear substrate 4 as the upper base or the colored substrate 5 as the lower base is increased.

The anchor layer-forming ink may contain, together with the above-mentioned acrylic resin, a crosslinking agent for crosslinking the acrylic resin. This crosslinking agent has the function of crosslinking the acrylic resin to impart mechanical strength to the entire anchor layer, and is thus generally also referred to as a "curing agent." Examples of crosslinking agents (curing agents) that can be added to the anchor layer-forming ink include urethane curing agents. More specifically, examples of urethane curing agents that can be added to the anchor layer-forming ink include XDI (xylylene diisocyanate) and MMDI (monomeric diphenylmethane diisocyanate). In the present embodiment, these can be used alone or as a mixture thereof.

When the anchor layer-forming ink contains a crosslinking agent, the content of the crosslinking agent is preferably within a range of more than 0 parts by mass and 5 parts by mass or less when the content of the acrylic resin in the anchor layer 3 is 100 parts by mass. When the content of the crosslinking agent is within the above numerical range, the coating properties of the anchor layer-forming ink are improved.

In addition to the above binder, the anchor layer-forming ink may suitably contain, for example, an organic or inorganic dye or pigment, and optionally an extender pigment, a filler, a tackifier, a dispersant, a defoaming agent, a stabilizer, and other additives. Further, the anchor layer-forming ink is adjusted to a desired viscosity with an appropriate diluting solvent. The anchor layer-forming ink may be an ink containing a non-acrylic resin, instead of the ink containing an acrylic resin described above. Examples of the non-acrylic resin contained in the ink containing a non-acrylic resin include urethane resins.

The method for forming the anchor layer 3 is not particularly limited. Usable examples include any printing methods, such as a gravure printing method, an offset printing method, a screen printing method, a flexographic printing method, a relief printing method, and an inkjet printing method.

(Method for Producing Decorative Sheet 10)

An example of the method for producing the decorative sheet 10 will be briefly described.

First, the pattern layer-forming ink described above is applied to a first surface of the acrylic resin original member 1 to form a pattern layer 2.

Next, the anchor layer-forming ink described above is applied to the acrylic resin original member 1, on which the pattern layer 2 is formed, to form an anchor layer 3.

In this manner, the decorative sheet 10 according to the present embodiment is produced.

(Configuration of Decorative Material 20)

The configuration of a decorative material 20 will be described using FIG. 2.

Figure 2:
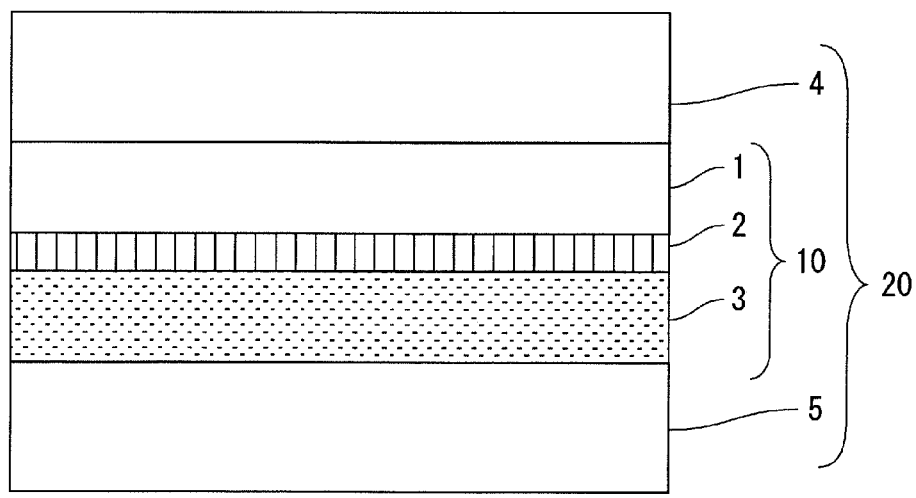
FIG. 2 is a cross-sectional view illustrating a configuration of a decorative material according to the first embodiment of the present invention.

As shown in FIG. 2, the decorative material 20 comprises a clear substrate 4 made of an acrylic resin, a decorative sheet 10, and a colored substrate 5 made of an acrylic resin. More specifically, the decorative material 20 comprises an acrylic resin original member 1, which is an original member made of an acrylic resin, a pattern layer 2 containing an acrylic resin as a binder and formed on a first surface of the acrylic resin original member 1, an anchor layer 3 formed on a surface of the pattern layer 2 facing away from the acrylic resin original member 1, a clear substrate 4 made of an acrylic resin and formed on a second surface of the acrylic resin original member 1, and a colored substrate 5 made of an acrylic resin and formed on an opposite surface to where the anchor layer 3 and the pattern layer 2 are located. Here, the clear substrate 4 is a substrate generally called an "upper base." Further, the colored substrate 5 is a substrate generally called a "lower base." That is, the decorative material 20 is provided with the clear substrate 4 as an upper base and the colored substrate 5 as a lower base on the back-printed decorative sheet 10. Therefore, the clear substrate 4 as the upper base and the colored substrate 5 as the lower base will be described below, and the description of the decorative sheet 10 will be omitted.

(Clear Substrate 4)

The clear substrate 4 is a substrate made of an acrylic resin, and is a layer for protecting the surface of the acrylic resin original member 1.

The clear substrate 4 used is, for example, a sheet-like resin substrate comprising an acrylate copolymer resin as a main component. Specifically, in terms of the balance with the hardness, thermal shrinkage properties, etc., of the acrylic resin original member 1, examples of the material of the clear substrate 4 include those comprising an acrylate copolymer resin as a main component, such as an ethylene-methyl acrylate copolymer resin (EMA), an ethylene-ethyl acrylate copolymer resin (EEA), an ethylene-methacrylic acid copolymer resin (EMAA), an ethylene-acrylic acid copolymer resin (EAA), an ionomer resin, and a mixture thereof. Here, the "main component" refers to a component that is contained in the largest amount, among the components constituting the clear substrate 4.

The above-described copolymer resins have an advantage in that the hardness of the substrate can be changed in any manner depending on the copolymer composition, and thus may be suitably used in the decorative material 20 according to the present embodiment. In particular, in consideration of the balance between the hardness and flexibility of the decorative material 20, it is most preferable to use an ethylene-methyl methacrylate copolymer resin (EMAA).

The thickness of the clear substrate 4 is not particularly limited and may have any thickness. However, in consideration of the thickness of the entire decorative material 20 etc., a thickness of approximately 100 µm to 800 µm is generally suitable.

The method for forming the clear substrate 4 is not particularly limited. For example, any molding method, such as an extrusion molding method, can be used.

The clear substrate 4 suitably contains an inorganic filler in order to reduce thermal shrinkage properties. Examples of inorganic fillers include silica, alumina, calcium carbonate, barium sulfate, titanium oxide, zinc oxide, kaolin, talc, and the like. These can be used alone or as a mixture of two or more types. From the viewpoint of the effect of reducing thermal shrinkage properties, it is most desirable to use talc as a main component. The content of the inorganic filler is generally required to be at least 20 parts by mass or more per 100 parts by mass of the resin component, and is desirably appropriately designed within a range of 50 parts by mass or more and 500 parts by mass or less. Within the above numerical range, the thermal shrinkage properties of the clear substrate 4 can be effectively reduced.

The clear substrate 4 may be colored as long as it is transparent. In order to color the clear substrate 4 to a desired color tone, a colorant, such as an inorganic pigment or an organic pigment, may be added. In addition, various additives, such as ultraviolet absorbers, light stabilizers, antioxidants, internal mold release agents, antistatic agents, and antibacterial agents, may be suitably added, as needed.

(Colored Substrate 5)

The colored substrate 5 is a substrate made of an acrylic resin, and is a layer to be attached to the anchor layer 3.

The colored substrate 5 used is, for example, a sheet-like resin substrate comprising an acrylate copolymer resin as a main component. Specifically, in terms of the balance with the hardness, thermal shrinkage properties, etc., of the anchor layer 3, examples of the material of the colored substrate 5 include those comprising an acrylate copolymer resin as a main component, such as an ethylene-methyl acrylate copolymer resin (EMA), an ethylene-ethyl acrylate copolymer resin (EEA), an ethylene-methacrylic acid copolymer resin (EMAA), an ethylene-acrylic acid copolymer resin (EAA), an ionomer resin, and a mixture thereof. Here, the "main component" refers to a component that is contained in the largest amount, among the components constituting the colored substrate 5.

The above-described copolymer resins have an advantage in that the hardness of the substrate can be changed in any manner depending on the copolymer composition, and thus may be suitably used in the decorative material 20 according to the present embodiment. In particular, in consideration of the balance between the hardness and flexibility of the decorative material 20, it is most preferable to use an ethylene-methyl methacrylate copolymer resin (EMAA).

The thickness of the colored substrate 5 is not particularly limited and may have any thickness. However, in consideration of the thickness of the entire decorative material 20 etc., a thickness of approximately 500 µm to 1000 µm is generally suitable.

The method for forming the colored substrate 5 is not particularly limited. For example, any molding method, such as an extrusion molding method, can be used.

The colored substrate 5 suitably contains an inorganic filler in order to reduce thermal shrinkage properties. Examples of inorganic fillers include silica, alumina, calcium carbonate, barium sulfate, titanium oxide, zinc oxide, kaolin, talc, and the like. These can be used alone or as a mixture of two or more types. From the viewpoint of the effect of reducing thermal shrinkage properties, it is most desirable to use talc as a main component. The content of the inorganic filler is generally required to be at least 20 parts by mass or more per 100 parts by mass of the resin component, and is desirably appropriately designed within a range of 50 parts by mass or more and 500 parts by mass or less. Within the above numerical range, the thermal shrinkage properties of the colored substrate 5 can be effectively reduced.

In order to color the colored substrate 5 to a desired color tone, a colorant, such as an inorganic pigment or an organic pigment, may be added. In addition, various additives, such as ultraviolet absorbers, light stabilizers, antioxidants, internal mold release agents, antistatic agents, and antibacterial agents, may be suitably added, as needed.

(Method for Producing Decorative Material 20)

An example of the method for producing the decorative material 20 will be briefly described.

First, the decorative sheet 10 is arranged between the clear substrate 4 as the upper base and the colored substrate 5 as the lower base so that the acrylic resin original member 1 faces the clear substrate 4 and the anchor layer 3 faces the colored substrate 5. That is, the back-printed decorative sheet 10 is arranged between the clear substrate 4 and the colored substrate 5.

Next, the laminate is, for example, thermally laminated.

In this manner, the clear substrate 4 and the acrylic resin original member 1 are welded, and the colored substrate 5 and the anchor layer 3 are welded, thereby producing the decorative material 20.

As the method for thermally laminating the laminate, a circular pressing continuous lamination method can be used, in addition to a flat pressing method in abutment with a metal plate. In particular, the use of a continuous lamination method using an endless metal belt or a metal or cured resin heat drum is advantageous in that it is possible to continuously produce, at high speed, a high quality decorative material 20 that has no surface warping or waving, has good interlayer adhesion, and is densely cured and integrated.

(Configuration of Decorative Material 21)

The configuration of a decorative material 21, which is a modification of the decorative material 20 described above, will be described using FIG. 3.

Figure 3:
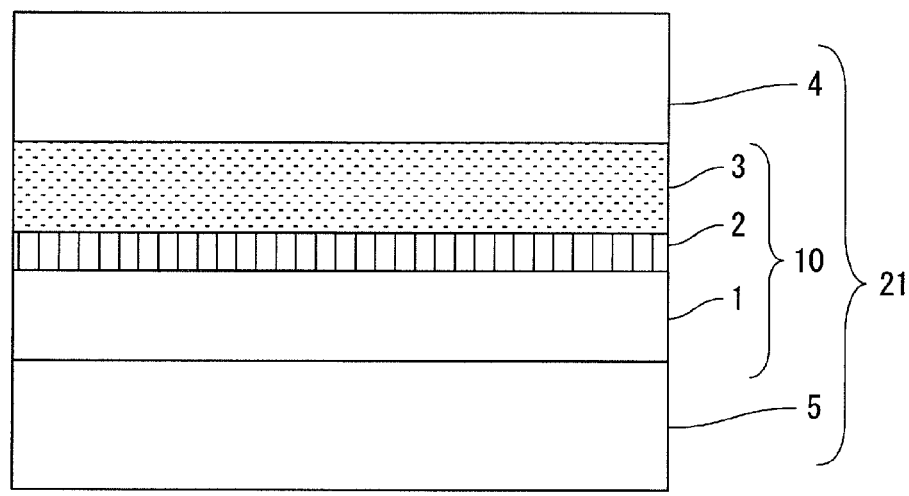
FIG. 3 is a cross-sectional view illustrating a configuration of a modification of the decorative material according to the first embodiment of the present invention.

As shown in FIG. 3, the decorative material 21 comprises a clear substrate 4 made of an acrylic resin, a decorative sheet 10, and a colored substrate 5 made of an acrylic resin. More specifically, the decorative material 21 comprises an acrylic resin original member 1, which is an original member made of an acrylic resin, a pattern layer 2 containing an acrylic resin as a binder and formed on a first surface of the acrylic resin original member 1, an anchor layer 3 formed on a surface of the pattern layer 2 facing away from the acrylic resin original member 1, a colored substrate 5 made of an acrylic resin and formed on a second surface of the acrylic resin original member 1, and a clear substrate 4 made of an acrylic resin and formed on a surface of the anchor layer 3 facing away from the pattern layer 2. That is, the decorative material 21 is provided with the clear substrate 4 as an upper base and the colored substrate 5 as a lower base on the front-printed decorative sheet 10.

Since each layer constituting the decorative material 21 is the same as each layer constituting the decorative material 20, the description thereof is omitted here.

(Method for Producing Decorative Material 21)

An example of the method for producing the decorative sheet 21 will be briefly described.

First, the decorative sheet 10 is arranged between the clear substrate 4 as the upper base and the colored substrate 5 as the lower base so that the anchor layer 3 faces the clear substrate 4 and the acrylic resin original member 1 faces the colored substrate 5. That is, the front-printed decorative sheet 10 is arranged between the clear substrate 4 and the colored substrate 5.

Next, the laminate is, for example, thermally laminated.

In this manner, the clear substrate 4 and the anchor layer 3 are welded, and the colored substrate 5 and the acrylic resin original member 1 are welded, thereby producing the decorative material 21.

Since the method for thermally laminating the laminate is the same as in the method for producing the decorative material 20, the description thereof is omitted here.

The embodiment described above is an example of the present invention, and the present invention is not limited to the embodiment described above. Various modifications can be made according to a design and the like without departing from the technical idea of the present invention.

Effects of the Present Embodiment

The decorative sheet 10 of the first embodiment achieves the effects described below.

(1) The decorative sheet 10 comprises an acrylic resin original member 1, which is an original member made of an acrylic resin, a pattern layer 2 containing an acrylic resin as a binder and formed on a first surface of the acrylic resin original member 1, and an anchor layer 3 formed on a surface of the pattern layer 2 facing away from the acrylic resin original member 1.

With this configuration, since the decorative sheet 10 comprises the anchor layer 3, it is possible to increase the adhesion between the decorative sheet 10 and the clear substrate 4 made of an acrylic resin as the upper base or the colored substrate 5 made of an acrylic resin as the lower base to such a degree that there is no problem in use, and to reduce the occurrence of appearance defects.

(2) The anchor layer 3 may contain an acrylic resin.

With this configuration, it is possible to further increase the adhesion between the decorative sheet 10 and the clear substrate 4 as the upper base or the colored substrate 5 as the lower base, and to further reduce the occurrence of appearance defects.

(3) The anchor layer 3 may further contain a crosslinking agent for crosslinking the acrylic resin contained in the anchor layer 3, and the content of the crosslinking agent contained in the anchor layer 3 may be within a range of more than 0 parts by mass and 5 parts by mass or less when the content of the acrylic resin in the anchor layer 3 is 100 parts by mass.

With this configuration, it is possible to further increase the adhesion between the decorative sheet 10 and the clear substrate 4 as the upper base or the colored substrate 5 as the lower base, and to further reduce the occurrence of appearance defects.

(4) The glass transition temperature of the acrylic resin contained in the anchor layer 3 may be within a range of 90° C. or more and 100° C. or less.

With this configuration, it is possible to further increase the adhesion between the decorative sheet 10 and the clear substrate 4 as the upper base or the colored substrate 5 as the lower base, and to further reduce the occurrence of appearance defects.

(5) The coating amount of the anchor layer 3 may be within a range of 0.5 g/m$^2$ or more and 2.0 g/m$^2$ or less.

With this configuration, it is possible to further increase the adhesion between the decorative sheet 10 and the clear substrate 4 as the upper base or the colored substrate 5 as the lower base, and to further reduce the occurrence of appearance defects.

(6) The pattern layer 2 may further contain a crosslinking agent for crosslinking the acrylic resin contained in the pattern layer 2, and the content of the crosslinking agent contained in the pattern layer 2 may be within a range of more than 0 parts by mass and 3 parts by mass or less when the content of the acrylic resin in the pattern layer 2 is 100 parts by mass.

With this configuration, the pattern layer 2 can be reliably formed.

Further, the decorative material 20 and decorative material 21 of the present embodiment achieve the effects described below.

(7) The decorative material 20 comprises an acrylic resin original member 1 made of an acrylic resin, a pattern layer 2 containing an acrylic resin as a binder and formed on a first surface of the acrylic resin original member 1, an anchor layer 3 formed on a surface of the pattern layer 2 facing away from the acrylic resin original member 1, a clear substrate 4 made of an acrylic resin and formed on a second surface of the acrylic resin original member 1, and a colored substrate 5 made of an acrylic resin and formed on a surface of the anchor layer 3 facing away from the pattern layer 2.

With this configuration, since the decorative material 20 comprises the anchor layer 3, it is possible to increase the adhesion between the decorative sheet 10 and the clear substrate 4 made of an acrylic resin as the upper base or the colored substrate 5 made of an acrylic resin as the lower base to such a degree that there is no problem in use, and to reduce the occurrence of appearance defects.

(8) The decorative material 21 comprises an acrylic resin original member 1 made of an acrylic resin, a pattern layer 2 containing an acrylic resin as a binder and formed on a first surface of the acrylic resin original member 1, an anchor layer 3 formed on a surface of the pattern layer 2 facing away from the acrylic resin original member 1, a colored substrate 5 made of an acrylic resin and formed on a second surface of the acrylic resin original member 1, and a clear substrate 4 made of an acrylic resin and formed on a surface of the anchor layer 3 facing away from the pattern layer 2.

With this configuration, since the decorative material 21 comprises the anchor layer 3, it is possible to increase the adhesion between the decorative sheet 10 and the clear substrate 4 made of an acrylic resin as the upper base or the colored substrate 5 made of an acrylic resin as the lower base to such a degree that there is no problem in use, and to reduce the occurrence of appearance defects.

Moreover, the methods for producing the decorative material 20 and the decorative material 21 of the present embodiment achieve the effects described below.

(9) The method for producing the decorative material 20 comprises a step of thermally laminating a laminate comprising an acrylic resin original member 1 made of an acrylic resin, a pattern layer 2 containing an acrylic resin as a binder and formed on a first surface of the acrylic resin original member 1, an anchor layer 3 formed on a surface of the pattern layer 2 facing away from the acrylic resin original member 1, a clear substrate 4 made of an acrylic resin and formed on a second surface of the acrylic resin original member 1, and a colored substrate 5 made of an acrylic resin and formed on a surface of the anchor layer 3 facing away from the pattern layer 2.

With this configuration, since the decorative material 20 comprises the anchor layer 3, it is possible to increase the adhesion between the decorative sheet 10 and the clear substrate 4 made of an acrylic resin as the upper base or the colored substrate 5 made of an acrylic resin as the lower base to such a degree that there is no problem in use, and to reduce the occurrence of appearance defects.

(10) The method for producing the decorative material 21 comprises a step of thermally laminating a laminate comprising an acrylic resin original member 1 made of an acrylic resin, a pattern layer 2 containing an acrylic resin as a binder and formed on a first surface of the acrylic resin original member 1, an anchor layer 3 formed on a surface of the pattern layer 2 facing away from the acrylic resin original member 1, a colored substrate 5 made of an acrylic resin and formed on a second surface of the acrylic resin original member 1, and a clear substrate 4 made of an acrylic resin and formed on a surface of the anchor layer 3 facing away from the pattern layer 2.

With this configuration, since the decorative material 21 comprises the anchor layer 3, it is possible to increase the adhesion between the decorative sheet 10 and the clear substrate 4 made of an acrylic resin as the upper base or the colored substrate 5 made of an acrylic resin as the lower base to such a degree that there is no problem in use, and to reduce the occurrence of appearance defects.

(Modification)

The present invention is not limited to the first embodiment described above. For example, in the decorative sheet of the first embodiment, a dynamic friction coefficient (sliding resistance value) of the surface of the acrylic resin original member 1 facing away from the pattern layer 2 measured according to JIS K 7125 (ISO 8295) may be within a range of 0.5 or more and 1.5 or less.

Further, the decorative sheet thermally expands immediately prior to thermal lamination; however, if the dynamic friction coefficient (sliding resistance value) of the surface of the acrylic resin original member 1 facing away from the pattern layer 2 is greater than the above numerical range, the decorative sheet does not convey smoothly on a turning roller, and thus heat wrinkles may be formed. However, if the dynamic friction coefficient (sliding resistance value) of the surface of the acrylic resin original member 1 facing away from the pattern layer 2 is within the above numerical range, the decorative sheet is conveyed onto the turning roller smoothly, and thus heat wrinkles are less likely to be formed. If the dynamic friction coefficient (sliding resistance value) of the surface of the acrylic resin original member 1 facing away from the pattern layer 2 is less than the above numerical range, the decorative sheet slides too much on the turning roller, and thus thermal lamination tends to be difficult.

Moreover, when the dynamic friction coefficient (sliding resistance value) of the surface of the acrylic resin original member 1 facing away from the pattern layer 2 is set within the above numerical range, a matte appearance can be imparted to the decorative sheet 10.

FIRST EXAMPLES

Example 1-1

As the acrylic resin original member, an original member made of an ethylene-methyl methacrylate copolymer resin (EMAA) was used.

The pattern layer was formed by applying a pattern layer-forming ink containing an ethylene-methyl methacrylate copolymer resin (EMAA) as a binder. The content of the ethylene-methyl methacrylate copolymer resin (EMAA) was 50 parts by mass relative to 100 parts by mass of the pattern layer-forming ink.

The anchor layer was formed by applying an anchor layer-forming ink containing a polyurethane resin. The anchor layer-forming ink of Example 1-1 does not contain a curing agent.

In this manner, a back-printed decorative sheet according to Example 1-1 was formed.

Then, the back-printed decorative sheet was arranged between a clear substrate as the upper base and a colored substrate as the lower base so that the acrylic resin original member faced towards the clear substrate and the anchor layer faced towards the colored substrate.

Finally, the laminate was thermally laminated to form a decorative material according to Example 1-1. The conditions for thermal lamination are as follows.

Temperature of upper part of heating bar: 145° C.
Temperature of lower part of heating bar: 145° C.
Pressing time: 120 seconds
Pressure: 3 kgf/cm$^2$ The dynamic friction coefficient of the surface of the acrylic resin original member facing away from the printing surface (the surface on which the pattern layer was formed) was 0.4, which was measured according to JIS K 7125.

The measurement condition of the dynamic friction coefficient measured according to JIS K 7125 is as follows.

The size of a test piece (measurement object) for measuring the dynamic friction coefficient was approximately 80 mm×200 mm. Further, the size of a sliding piece to be arranged on the measurement object was 63 mm×63 mm. Therefore, the contact area of the sliding piece relative to the test piece (measurement object) was 40 cm$^2$.

The total mass of the sliding piece was 200 g (1.96 N). The test speed was 100 mm/min. The load cell applied 100 N.

Example 1-2

A decorative material according to Example 1-2 was formed in the same manner as in Example 1-1, except that the anchor layer was formed by applying an anchor layer-forming ink containing an ethylene-methyl methacrylate copolymer resin (EMAA) as a binder.

Example 1-3

A pattern layer was formed using a pattern layer-forming ink in which 1 part by mass of a mixture of IPDI and HDI (mixing ratio: IPDI:HDI=9:1) was added as a curing agent relative to 100 parts by mass of an ethylene-methyl methacrylate copolymer resin (EMAA) as a binder.

Further, an anchor layer was formed using an anchor layer-forming ink in which 1 part by mass of a mixture of XDI and MMDI (mixing ratio: XDI:MMDI=9:1) was added as a curing agent relative to 100 parts by mass of an ethylene-methyl methacrylate copolymer resin (EMAA). A decorative material according to Example 1-3 was formed in the same manner as in Example 1-1 except for the above.

Example 1-4

A decorative material according to Example 1-4 was formed in the same manner as in Example 1-3, except that the anchor layer was formed using an anchor layer-forming ink in which 2 parts by mass of a mixture of XDI and MMDI (mixing ratio: XDI:MMDI=9:1) was added as a curing agent relative to 100 parts by mass of an ethylene-methyl methacrylate copolymer resin (EMAA).

Example 1-5

A decorative material according to Example 1-5 was formed in the same manner as in Example 1-3, except that the anchor layer was formed using an anchor layer-forming ink in which 3 parts by mass of a mixture of XDI and MMDI (mixing ratio: XDI:MMDI=9:1) was added as a curing agent relative to 100 parts by mass of an ethylene-methyl methacrylate copolymer resin (EMAA).

Example 1-6

A decorative material according to Example 1-6 was formed in the same manner as in Example 1-3, except that the anchor layer was formed using an anchor layer-forming ink in which 4 parts by mass of a mixture of XDI and MMDI (mixing ratio: XDI:MMDI=9:1) was added as a curing agent relative to 100 parts by mass of an ethylene-methyl methacrylate copolymer resin (EMAA).

Example 1-7

A decorative material according to Example 1-7 was formed in the same manner as in Example 1-3, except that the anchor layer was formed using an anchor layer-forming ink in which 5 parts by mass of a mixture of XDI and MMDI (mixing ratio: XDI:MMDI=9:1) was added as a curing agent relative to 100 parts by mass of an ethylene-methyl methacrylate copolymer resin (EMAA).

Example 1-8

A decorative material according to Example 1-8 was formed in the same manner as in Example 1-2, except that the glass transition temperature (Tg) of the ethylene-methyl methacrylate copolymer resin (EMAA) was changed to 90° C.

Example 1-9

A decorative material according to Example 1-9 was formed in the same manner as in Example 1-2, except that the glass transition temperature (Tg) of the ethylene-methyl methacrylate copolymer resin (EMAA) was changed to 95° C.

Example 1-10

A decorative material according to Example 1-10 was formed in the same manner as in Example 1-2, except that the glass transition temperature (Tg) of the ethylene-methyl methacrylate copolymer resin (EMAA) was changed to 100° C.

Example 1-11

A decorative material according to Example 1-11 was formed in the same manner as in Example 1-1, except for using an acrylic resin original member in which a surface facing away from a printing surface (surface on which a pattern layer was formed) of the original member had a dynamic friction coefficient of 1.0, which was measured according to JIS K 7125.

Example 1-12

A decorative material according to Example 1-12 was formed in the same manner as in Example 1-2, except for using an acrylic resin original member in which a surface facing away from a printing surface (surface on which a pattern layer was formed) of the original member had a dynamic friction coefficient of 1.0, which was measured according to JIS K 7125.

Example 1-13

A decorative material according to Example 1-13 was formed in the same manner as in Example 1-3, except for using an acrylic resin original member in which a surface facing way from a printing surface (surface on which a pattern layer was formed) of the original member had a dynamic friction coefficient of 1.0, which was measured according to JIS K 7125.

Example 1-14

A decorative material according to Example 1-14 was formed in the same manner as in Example 1-4, except for using an acrylic resin original member in which a surface facing away from a printing surface (surface on which a pattern layer was formed) of the original member had a dynamic friction coefficient of 1.0, which was measured according to JIS K 7125.

Example 1-15

A decorative material according to Example 1-15 was formed in the same manner as in Example 1-5, except for using an acrylic resin original member in which a surface facing away from a printing surface (surface on which a pattern layer was formed) of the original member had a dynamic friction coefficient of 1.0, which was measured according to JIS K 7125.

Example 1-16

A decorative material according to Example 1-16 was formed in the same manner as in Example 1-6, except for using an acrylic resin original member in which a surface facing away from a printing surface (surface on which a pattern layer was formed) of the original member had a dynamic friction coefficient of 1.0, which was measured according to JIS K 7125.

Example 1-17

A decorative material according to Example 1-17 was formed in the same manner as in Example 1-7, except for using an acrylic resin original member in which a surface facing away from a printing surface (surface on which a pattern layer was formed) of the original member had a dynamic friction coefficient of 1.0, which was measured according to JIS K 7125.

Example 1-18

A decorative material according to Example 1-18 was formed in the same manner as in Example 1-8, except for using an acrylic resin original member in which a surface facing away from a printing surface (surface on which a pattern layer was formed) of the original member had a dynamic friction coefficient of 1.0, which was measured according to JIS K 7125.

Example 1-19

A decorative material according to Example 1-19 was formed in the same manner as in Example 1-9, except for using an acrylic resin original member in which a surface facing away from a printing surface (surface on which a pattern layer was formed) of the original member had a dynamic friction coefficient of 1.0, which was measured according to JIS K 7125.

Example 1-20

A decorative material according to Example 1-20 was formed in the same manner as in Example 1-10, except for using an acrylic resin original member in which a surface facing away from a printing surface (surface on which a pattern layer was formed) of the original member had a dynamic friction coefficient of 1.0, which was measured according to JIS K 7125.

Example 1-21

A decorative material according to Example 1-21 was formed in the same manner as in Example 1-1, except for using an acrylic resin original member in which a surface facing away from a printing surface (surface on which a pattern layer was formed) of the original member had a dynamic friction coefficient of 0.5, which was measured according to JIS K 7125.

Example 1-22

A decorative material according to Example 1-22 was formed in the same manner as in Example 1-1, except for using an acrylic resin original member in which a surface facing away from a printing surface (surface on which a pattern layer was formed) of the original member had a dynamic friction coefficient of 1.5, which was measured according to JIS K 7125.

Comparative Example 1-1

A decorative material according to Comparative Example 1-1 was formed in the same manner as in Example 1-1, except that the anchor layer was not provided.

<Performance Evaluation>

The following performance evaluation was conducted on the decorative materials of Examples 1-1 to 1-22 and the decorative material of Comparative Example 1-1.

Substrate Adhesion Evaluation

The above decorative materials were each evaluated for the degree of adhesion between each of the above decorative sheets and the clear substrate as the upper base or the colored substrate as the lower base. The evaluation method and evaluation criteria are as follows.

[Evaluation Method]

After cooling each of the decorative materials formed by thermal lamination according to the method described in Example 1-1, the decorative sheet and the clear substrate as the upper base or the colored substrate as the lower base were peeled off from each other to evaluate the adhesion of the decorative materials.

[Evaluation Criteria]

Good: No peeling of the substrate was observed, and there was no problem in use.

Fair: There was no problem in use, but slight peeling of the substrate was confirmed.

Poor: There was a problem in use.

Air Entrainment Evaluation

The above decorative materials were each evaluated for air entrainment occurring between each of the above decorative sheets and the clear substrate as the upper base or the colored substrate as the lower base. The evaluation method and evaluation criteria are as follows.

[Evaluation Method]

After cooling each of the decorative materials formed by thermal lamination according to the method described in Example 1-1, the appearance of each decorative material was visually observed to confirm the presence or absence of air entrainment.

[Evaluation Criteria]

Good: No air entrainment was observed, and there was no problem in use.

Fair: There was no problem in use, but slight air entrainment was confirmed.

Poor: There was a problem in use.

Heat Wrinkle Evaluation

The above decorative materials were each evaluated for heat wrinkles in each decorative sheet. The evaluation method and evaluation criteria are as follows.

[Evaluation Method]

After cooling each of the decorative materials formed by thermal lamination according to the method described in Example 1-1, the appearance of each decorative material was visually observed to confirm the presence or absence of heat wrinkles.

[Evaluation Criteria]

Good: No heat wrinkles were observed, and there was no problem in use.

Fair: There was no problem in use, but slight heat wrinkles were observed.

When the heat wrinkle evaluation is "good" or "fair," there is no problem in use.

Matte Appearance Evaluation

The above decorative materials were each evaluated for the matte appearance of each decorative sheet. The evaluation method and evaluation criteria are as follows.

[Evaluation Method]

After cooling each of the decorative materials formed by thermal lamination according to the method described in Example 1-1, the appearance of each decorative material was visually observed to confirm the presence or absence of a matte appearance.

[Evaluation Criteria]

Good: 25 or more out of 50 people determined that "there was a matte appearance."

Fair: 24 or fewer out of 50 people determined that "there was a matte appearance."

When the matte appearance evaluation is "good" or "fair," there is no problem in use.

Tables 1 to 3 show the results.

TABLE 1

| Layer configuration | Comparative Example 1-1 | Example 1-1 | | Example 1-2 | | Example 1-3 | | Example 1-4 | |
|---|---|---|---|---|---|---|---|---|---|
| Original Member | Acrylic resin original member | Acrylic resin original member | | Acrylic resin original member | | Acrylic resin original member | | Acrylic resin original member | |
| Pattern layer | Acrylic ink | Acrylic ink | | Acrylic ink | | Acrylic ink + curing agent | | Acrylic ink + curing agent | |
| Anchor layer | — | Non-acrylic ink | | Acrylic ink | | Acrylic ink + curing agent | | Acrylic ink + curing agent | |
| | | Non-acrylic resin [parts by mass] | Curing agent [parts by mass] | Acrylic resin [parts by mass] | Curing agent [parts by mass] | Acrylic resin [parts by mass] | Curing agent [parts by mass] | Acrylic resin [parts by mass] | |
| | | 100 | 0 | 100 | 0 | 100 | 1 | 100 | |
| Substrate adhesion evaluation | Poor | Fair | | Good | | Good | | Good | |
| Air entrainment evaluation | Poor | Fair | | Fair | | Good | | Good | |
| Heat wrinkle evaluation | Fair | Fair | | Fair | | Fair | | Fair | |
| Matte appearance evaluation | Fair | Fair | | Fair | | Fair | | Fair | |

| | Layer configuration | Example 1-4 | | Example 1-5 | | Example 1-6 | | Example 1-7 | |
|---|---|---|---|---|---|---|---|---|---|
| | Original Member | Acrylic resin original member | | Acrylic resin original member | | Acrylic resin original member | | Acrylic resin original member | |
| | Pattern layer | Acrylic ink + curing agent | | Acrylic ink + curing agent | | Acrylic ink + curing agent | | Acrylic ink + curing agent | |
| | Anchor layer | Acrylic ink + curing agent | | Acrylic ink + curing agent | | Acrylic ink + curing agent | | Acrylic ink + curing agent | |
| | | Curing agent [parts by mass] | | Acrylic resin [parts by mass] | Curing agent [parts by mass] | Acrylic resin [parts by mass] | Curing agent [parts by mass] | Acrylic resin [parts by mass] | Curing agent [parts by mass] |
| | | 2 | | 100 | 3 | 100 | 4 | 100 | 5 |
| | Substrate adhesion evaluation | Good | | Good | | Fair | | Fair | |
| | Air entrainment evaluation | Good | | Good | | Good | | Good | |
| | Heat wrinkle evaluation | Fair | | Fair | | Fair | | Fair | |
| | Matte appearance evaluation | Fair | | Fair | | Fair | | Fair | |

TABLE 2

| | Example 1-8 | | | Example 1-9 | | | Example 1-10 | | |
|---|---|---|---|---|---|---|---|---|---|
| Anchor layer | Acrylic resin | | | Acrylic resin | | | Acrylic resin | | |
| | Glass transition temperature [° C.] | [parts by mass] | Curing agent [parts by mass] | Glass transition temperature [° C.] | [parts by mass] | Curing agent [parts by mass] | Glass transition temperature [° C.] | [parts by mass] | Curing agent [parts by mass] |
| | 90° C. | 100 | 0 | 95° C. | 100 | 0 | 100° C. | 100 | 0 |
| Substrate adhesion evaluation | Fair | | | Good | | | Fair | | |
| Air entrainment evaluation | Fair | | | Fair | | | Fair | | |
| Heat wrinkle evaluation | Fair | | | Fair | | | Fair | | |

TABLE 2-continued

|  | Example 1-8 | Example 1-9 | Example 1-10 |
|---|---|---|---|
| Matte appearance evaluation | Fair | Fair | Fair |

TABLE 3

|  | Example 1-1 | Example 1-11 | Example 1-12 | Example 1-13 | Example 1-14 | Example 1-15 | Example 1-16 |
|---|---|---|---|---|---|---|---|
| Dynamic friction coefficient of acrylic resin original member | 0.4 | 1.0 | 1.0 | 1.0 | 1.0 | 1.0 | 1.0 |
| Substrate adhesion evaluation | Fair | Good | Good | Good | Good | Good | Good |
| Air entrainment evaluation | Fair | Good | Good | Good | Good | Good | Good |
| Heat wrinkle evaluation | Fair | Good | Good | Good | Good | Good | Good |
| Matte appearance evaluation | Fair | Good | Good | Good | Good | Good | Good |

|  | Example 1-17 | Example 1-18 | Example 1-19 | Example 1-20 | Example 1-21 | Example 1-22 |
|---|---|---|---|---|---|---|
| Dynamic friction coefficient of acrylic resin original member | 1.0 | 1.0 | 1.0 | 1.0 | 0.5 | 1.5 |
| Substrate adhesion evaluation | Good | Good | Good | Good | Good | Good |
| Air entrainment evaluation | Good | Good | Good | Good | Good | Good |
| Heat wrinkle evaluation | Good | Good | Good | Good | Good | Good |
| Matte appearance evaluation | Good | Good | Good | Good | Good | Good |

(Evaluation Results)

As shown in Table 1, in Examples 1-1 and 1-2, the substrate adhesion evaluation and the air entrainment evaluation were both improved as compared with Comparative Example 1-1. This confirmed that when the decorative sheet was provided with an anchor layer, regardless of whether it contained an acrylic resin, the adhesion between the decorative sheet and the substrates (the clear substrate as the upper base and the colored substrate as the lower base) was increased, and the occurrence of air entrainment was reduced which led to improvement in appearance defects.

Further, a comparison between Examples 1-1 and 1-2 confirmed that the inclusion of the acrylic resin in the anchor layer reduced the occurrence of air entrainment that led to further improvement in appearance defects.

The results of Examples 1-2 to 1-7 confirmed that when the content of the curing agent contained in the anchor layer was within a range of more than 0 parts by mass and 5 parts by mass or less relative to 100 parts by mass of the acrylic resin in the anchor layer, the adhesion between the decorative sheet and the substrates (the clear substrate as the upper base and the colored substrate as the lower base) was increased, and the occurrence of air entrainment was reduced which led to improvement in appearance defects.

Further, the results of Examples 1-8 to 1-10 confirmed that when the glass transition temperature of the acrylic resin contained in the anchor layer was within a range of 90° C. or more and 100 or less, the adhesion between the decorative sheet and the substrates (the clear substrate as the upper base and the colored substrate as the lower base) was increased, and the occurrence of air entrainment was reduced which led to improvement in appearance defects.

The results of Examples 1-11 to 1-22 revealed that the formation of heat wrinkles could be prevented when the dynamic friction coefficient of the surface of the acrylic resin original member facing away from the printing surface (the surface on which the pattern layer was formed) was within a range of 0.5 or more and 1.5 or less, which was measured according to JIS K 7125.

Further, the results of Examples 1-11 to 1-22 revealed that a matte appearance could be imparted to the decorative sheet when the dynamic friction coefficient of the surface of the acrylic resin original member facing away from the printing surface (the surface on which the pattern layer was formed) was within a range of 0.5 or more and 1.5 or less, which was measured according to JIS K 7125.

Second Embodiment

A second embodiment of the present invention will be described below with reference to the drawings.

(Configuration of Decorative Sheet 11)

Figure 4:
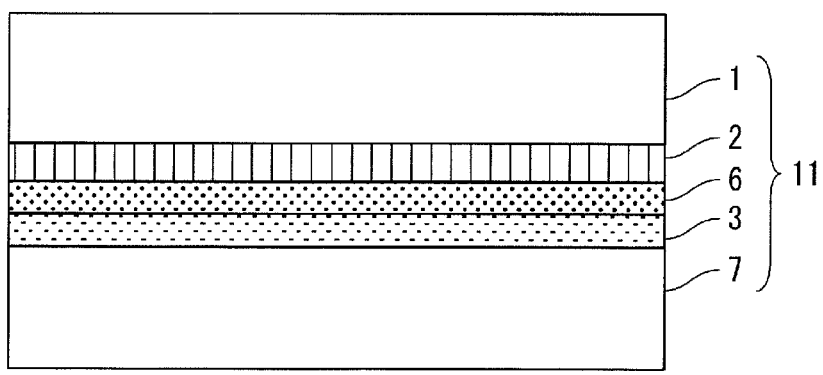
FIG. 4 is a cross-sectional view illustrating a configuration of a decorative sheet according to a second embodiment of the present invention.

As shown in FIG. 4, the decorative sheet 11 comprises a first acrylic resin original member 1, a pattern layer 2, an adhesive layer 6, an anchor layer 3, and a second acrylic resin original member 7. More specifically, the decorative sheet 11 comprises a first acrylic resin original member 1, which is an original member made of an acrylic resin, a pattern layer 2 containing an acrylic resin as a binder and formed on a first surface of the first acrylic resin original member 1, an adhesive layer 6 containing a curing agent and formed on a surface of the pattern layer 2 facing away from the first acrylic resin original member 1, an anchor layer 3 formed on a surface of the adhesive layer 6 facing away from the pattern layer 2, and a second acrylic resin original member 7 made of an acrylic resin and formed on a surface of the anchor layer 3 facing away from the adhesive layer 6.

The details of each of the above layers will be described below.

(First Acrylic Resin Original Member 1)

The first acrylic resin original member 1 is an original member made of an acrylic resin, and is a layer that imparts, together with the second acrylic resin original member 7 described later, mechanical strength to the decorative sheet 11, that is, a layer that serves as a supporting medium for the decorative sheet 11. The first acrylic resin original member 1 according to the present embodiment is the same original member as the acrylic resin original member 1 described in the first embodiment. Therefore, the description of the first acrylic resin original member 1 according to the present embodiment is omitted here.

(Pattern Layer 2)

The pattern layer 2 is a layer for imparting a pattern to the decorative sheet 11, and is formed on a first surface of the first acrylic resin original member 1, as shown in FIG. 4.

The type of pattern design on the pattern layer 2 is not particularly limited. For example, wood grain patterns, stone grain patterns, cloth grain patterns, abstract patterns, geometric figures, characters, symbols, and the like can be used alone or in combination of two or more.

The pattern layer 2 is formed by applying an ink containing a urethane/vinyl chloride-vinyl acetate resin as a binder (hereinafter also referred to as the "pattern layer-forming ink") to a first surface of the first acrylic resin original member 1. Because the pattern layer 2 is made of a urethane resin, the pattern layer 2 is prevented from being melted during coating of an adhesive layer-forming ink described later to the pattern layer-forming ink.

The pattern layer-forming ink may contain, together with the above-mentioned urethane/vinyl chloride-vinyl acetate resin, a crosslinking agent for crosslinking the urethane/vinyl chloride-vinyl acetate resin. This crosslinking agent has the function of crosslinking the urethane/vinyl chloride-vinyl acetate resin to impart mechanical strength to the entire pattern layer, and is thus generally also referred to as a "curing agent." Examples of crosslinking agents (curing agents) that can be added to the pattern layer-forming ink include urethane curing agents. More specifically, examples of urethane curing agents that can be added to the pattern layer-forming ink include IPDI (isophorone diisocyanate) and HDI (hexamethylene diisocyanate). In the present embodiment, these can be used alone or as a mixture thereof.

When the pattern layer-forming ink contains a crosslinking agent, the content of the crosslinking agent is preferably within a range of more than 0 parts by mass and 3 parts by mass or less when the content of the urethane resin in the pattern layer 2 is 100 parts by mass. When the content of the crosslinking agent is within the above numerical range, the coating properties of the pattern layer-forming ink are improved. The content of the crosslinking agent is preferably 3 parts by mass when the content of the urethane resin in the pattern layer 2 is 100 parts by mass. That is, a mixing ratio, which is a mass ratio of the urethane/vinyl chloride-vinyl acetate resin to the urethane curing agent contained in the pattern layer 2, is preferably 100/3.

In addition to the above binder, the pattern layer-forming ink may suitably contain, for example, an organic or inorganic dye or pigment, and optionally an extender pigment, a filler, a tackifier, a dispersant, a defoaming agent, a stabilizer, and other additives. Further, the pattern layer-forming ink is adjusted to a desired viscosity with an appropriate diluting solvent.

The method for forming the pattern layer 2 is not particularly limited. Usable examples include any printing methods, such as a gravure printing method, an offset printing method, a screen printing method, a flexographic printing method, a relief printing method, and an inkjet printing method.

Moreover, when a solid ink layer (not shown) is provided between the first acrylic resin original member 1 and the pattern layer 2 for the purpose of base coloration, usable examples of the method for forming the solid ink layer include, in addition to the various printing methods described above, any coating methods, such as a roll coating method, a gravure coating method, a rod coating method, a knife coating method, an air knife coating method, a spray coating method, a lip coating method, and a die coating method.

(Adhesive Layer 6)

The adhesive layer 6 is a layer for increasing the adhesion between the pattern layer 2 and the anchor layer 3, and is formed on a surface of the pattern layer 2 facing away from the first acrylic resin original member 1, as shown in FIG. 4.

The adhesive layer 6 is formed by applying an ink containing a urethane resin (hereinafter also referred to as the "adhesive layer-forming ink") to a surface of the pattern layer 2 facing away from the first acrylic resin original member 1.

The coating amount (forming amount) of the adhesive layer 6 is preferably within a range of 5.0 g/m$^2$ or more and 6.0 g/m$^2$ or less. When the coating amount of the adhesive layer 6 is within the above numerical range, it is possible to increase the adhesion between the pattern layer 2 and the anchor layer 3 to such a degree that there is no problem in use, and to reduce the occurrence of appearance defects.

Further, the adhesive layer-forming ink contains, together with the above urethane resin, a curing agent (crosslinking agent) for crosslinking the urethane resin. Examples of curing agents that can be added to the adhesive layer-forming ink include urethane curing agents. More specifically, examples of urethane curing agents that can be added to the anchor layer-forming ink include IPDI (isophorone diisocyanate) and HDI (hexamethylene diisocyanate). In the present embodiment, these can be used alone or as a mixture thereof.

When the adhesive layer-forming ink contains a curing agent, the content of the curing agent is preferably within a range of more than 0 parts by mass and 20 parts by mass or less when the content of the urethane resin in the adhesive layer 6 is 100 parts by mass. When the content of the curing agent is within the above numerical range, the coating properties of the adhesive layer-forming ink are improved.

(Anchor Layer 3)

The anchor layer 3 is a layer for reducing the occurrence of appearance defects, and is formed on a surface of the adhesive layer 6 facing away from the pattern layer 2, as shown in FIG. 4.

The anchor layer 3 is formed by applying an ink containing a urethane resin (hereinafter also referred to as the "anchor layer-forming ink") to a surface of the adhesive layer 6 facing away from the pattern layer 2.

The coating amount (forming amount) of the anchor layer 3 is preferably within a range of 1.2 g/m$^2$ or more and 1.6 g/m$^2$ or less. When the coating amount of the anchor layer 3 is within the above numerical range, it is possible to increase the adhesion between the anchor layer 3 and the second acrylic resin original member 7 to such a degree that there is no problem in use.

In addition to the above urethane resin, the anchor layer-forming ink may suitably contain, for example, an organic or inorganic dye or pigment, and optionally an extender pigment, a filler, a tackifier, a dispersant, a defoaming agent, a stabilizer, and other additives. Further, the anchor layer-forming ink is adjusted to a desired viscosity with an appropriate diluting solvent.

The method for forming the anchor layer 3 is not particularly limited. Usable examples include any printing methods, such as a gravure printing method, an offset printing method, a screen printing method, a flexographic printing method, a relief printing method, and an inkjet printing method.

(Second Acrylic Resin Original Member 7)

As with the first acrylic resin original member 1, the second acrylic resin original member 7 is an original member made of an acrylic resin, and is a layer that imparts mechanical strength to the decorative sheet 11, that is, a layer that serves as a supporting medium for the decorative sheet 11.

The second acrylic resin original member 7 is a layer formed on a surface of the anchor layer 3 facing away from the adhesive layer 6.

The material and thickness of the second acrylic resin original member 7 can be the same as those of the first acrylic resin original member 1.

The second acrylic resin original member 7 is formed by bonding by dry lamination to the first acrylic resin original member 1 coated with the pattern layer 2, the adhesive layer 6, and the anchor layer 3.

(Method for Producing Decorative Sheet 11)

An example of the method for producing the decorative sheet 11 will be briefly described.

First, the pattern layer-forming ink described above is applied to a first surface of the first acrylic resin original member 1 to form a pattern layer 2.

Next, the adhesive layer-forming ink described above is applied to the first acrylic resin original member 1, on which the pattern layer 2 is formed, to form an adhesive layer 6.

Further, the anchor layer-forming ink described above is applied to the first acrylic resin original member 1, on which the pattern layer 2 and the adhesive layer 6 are sequentially formed, to form an anchor layer 3.

Then, the first acrylic resin original member 1, on which the pattern layer 2, the adhesive layer 6, and the anchor layer 3 are sequentially formed, is bonded by dry lamination to the second acrylic resin original member 7, thereby producing the decorative sheet 11 according to the present embodiment. The second acrylic resin original member 7 is bonded to the anchor layer 3 on the first acrylic resin original member 1.

(Decorative Material 22)

The configuration of a decorative material 22 will be described using FIG. 5.

Figure 5:
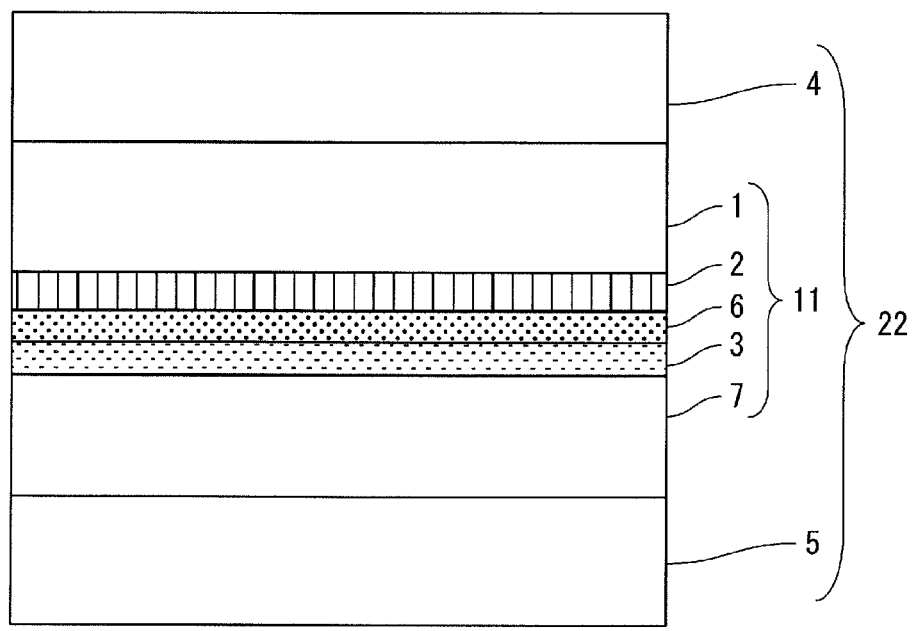
FIG. 5 is a cross-sectional view illustrating a configuration of a decorative material using the decorative sheet according to the second embodiment of the present invention.

As shown in FIG. 5, the decorative material 22 comprises a clear substrate 4 made of an acrylic resin, the decorative sheet 11 described above, and a colored substrate 5 made of an acrylic resin. More specifically, the decorative material 22 comprises a first acrylic resin original member 1, which is an original member made of an acrylic resin, a pattern layer 2 containing a urethane resin as a binder and formed on a first surface of the first acrylic resin original member 1, an adhesive layer 6 formed on a surface of the pattern layer 2 facing away from the first acrylic resin original member 1, an anchor layer 3 formed on a surface of the adhesive layer 6 facing away from the pattern layer 2, a second acrylic resin original member 7, which is an original member made of an acrylic resin, formed on a surface of the anchor layer 3 facing away from the adhesive layer 6, a clear substrate 4 made of an acrylic resin and formed on a second surface of the first acrylic resin original member 1, and a colored substrate 5 made of an acrylic resin and formed on a second surface of the second acrylic resin original member 7.

(Clear Substrate 4)

The clear substrate 4 is a substrate made of an acrylic resin, and is a layer for protecting the surface of the first acrylic resin original member 1. The clear substrate 4 according to the present embodiment is the same substrate as the clear substrate 4 described in the first embodiment. Therefore, the description of the clear substrate 4 according to the present embodiment is omitted here.

(Colored Substrate 5)

The colored substrate 5 is a substrate made of an acrylic resin, and is a layer to be attached to the second acrylic resin original member 7. The colored substrate 5 according to the present embodiment is the same substrate as the colored substrate 5 described in the first embodiment. Therefore, the description of the colored substrate 5 according to the present embodiment is omitted here.

The colored substrate 5 used is, for example, a sheet-like resin substrate comprising an acrylate copolymer resin as a main component. Specifically, in terms of the balance with the hardness, thermal shrinkage properties, etc., of the second acrylic resin original member 7, examples of the material of the colored substrate 5 include those comprising an acrylate copolymer resin as a main component, such as an ethylene-methyl acrylate copolymer resin (EMA), an ethylene-ethyl acrylate copolymer resin (EEA), an ethylene-methacrylic acid copolymer resin (EMAA), an ethylene-acrylic acid copolymer resin (EAA), an ionomer resin, and a mixture thereof.

(Method for Producing Decorative Material 22)

An example of the method for producing the decorative sheet 22 will be briefly described.

First, the decorative sheet 11 is arranged between the clear substrate 4 as the upper base and the colored substrate 5 as the lower base so that the first acrylic resin original member 1 faces the clear substrate 4 and the second acrylic resin original member 7 faces the colored substrate 5. That is, the back-printed decorative sheet 11 is arranged between the clear substrate 4 and the colored substrate 5.

Next, the laminate is, for example, thermally laminated.

In this manner, the clear substrate 4 and the first acrylic resin original member 1 are welded, and the colored substrate 5 and the second acrylic resin original member 7 are welded, thereby producing the decorative material 22.

As the method for thermally laminating the laminate, a circular pressing continuous lamination method can be used, in addition to a flat pressing method in abutment with a metal plate. In particular, the use of a continuous lamination method using an endless metal belt or a metal or cured resin heat drum is advantageous in that it is possible to continuously produce, at high speed, a high quality decorative material 22 that has no surface warping or waving, has good interlayer adhesion, and is densely cured and integrated.

The embodiment described above is an example of the present invention, and the present invention is not limited to the embodiment described above. Various modifications can be made according to a design and the like without departing from the technical idea of the present invention.

Effects of the Present Embodiment

The decorative sheet 11 of the present embodiment achieves the effects described below.

(1) The decorative sheet 11 comprises a first acrylic resin original member 1 made of an acrylic resin, a pattern layer 2 containing a urethane/vinyl chloride-vinyl acetate resin as a binder and formed on a first surface of the first acrylic resin original member 1, an adhesive layer 6 containing a curing agent and formed on a surface of the pattern layer 2 facing away from the first acrylic resin original member 1, an anchor layer 3 formed on a surface of the adhesive layer 6 facing away from the pattern layer 2, and a second acrylic resin original member 7 made of an acrylic resin and formed on a surface of the anchor layer 3 facing away from the adhesive layer 6.

With the above configuration (1), the first surface of the decorative sheet 11 is the first acrylic resin original member 1, and the second surface of the decorative sheet 11 is the second acrylic resin original member 7. When the decorative material 22 is produced by using the decorative sheet 11, the first acrylic resin original member 1 and the clear substrate 4 as the upper base are bonded by thermal lamination, and the second acrylic resin original member 7 and the colored substrate 5 as the lower base are bonded by thermal lamination. In this case, due to the strong adhesion between the first acrylic resin original member 1 and the clear substrate 4, the occurrence of adhesion failure and appearance defects can be reduced on the surface of the decorative sheet 11 on the first acrylic resin original member 1 side. Further, as with the first acrylic resin original member 1 side, the adhesion between the second acrylic resin original member 7 and the colored substrate 5 is also high. Accordingly, compared with a decorative sheet in which only a pattern layer is provided on the first surface of an acrylic resin original member, as in PTL 1, the occurrence of adhesion failure and appearance defects can be reduced on the surface of the decorative sheet 11 on the second acrylic resin original member 7 side. Further, compared with a decorative sheet in which a second acrylic resin original member is not provided and the surface on the lower base side is an anchor layer, the adhesion between the decorative sheet and the lower base can be increased, and the occurrence of adhesion failure and appearance defects can be reduced. That is, with the above configuration (1), when the decorative sheet 11 is thermally laminated together with the upper base and the lower base, the occurrence of adhesion failure and appearance defects of the decorative material 22 can be reduced.

Moreover, with the above configuration (1), an anchor layer 3 is provided between the adhesive layer 6 and the second acrylic resin original member 7. The adhesion between the adhesive layer 6 and the second acrylic resin original member 7 can be thereby increased.

(2) In the above configuration (1), the anchor layer 3 is made of a urethane resin.

(3) In the above configuration (2), the coating amount of the anchor layer 3 is 1.2 g/m² or more and 1.6 g/m² or less.

With the above configuration (3), it is possible to increase the adhesion between the pattern layer 2 and the anchor layer 3 to such a degree that there is no problem in use, and to reduce the occurrence of appearance defects.

(4) In any one of the above configurations (1) to (3), the pattern layer 2 contains a urethane curing agent as a curing agent, and a mixing ratio, which is a mass ratio of the urethane/vinyl chloride-vinyl acetate resin to the urethane curing agent, is 100/3.

With the above configuration (4), the coating properties of the pattern layer-forming ink, which forms the pattern layer 2, can be improved.

(Modification)

The present invention is not limited to the second embodiment described above. For example, in the decorative sheet of the second embodiment, the dynamic friction coefficient of the surface of the first acrylic resin original member 1 facing away from the pattern layer 2 measured according to JIS K 7125 (ISO 8295) may be within a range of 0.5 or more and 1.5 or less.

Because the dynamic friction coefficient of the surface of the first acrylic resin original member 1 facing away from the pattern layer 2 is within the above numerical range, a matte appearance can be imparted to the decorative sheet 11.

Further, the decorative sheet 11 thermally expands immediately prior to thermal lamination; however, if the dynamic friction coefficient of the surface of the first acrylic resin original member 1 facing away from the pattern layer 2 is greater than the above numerical range, the decorative sheet does not convey smoothly on a turning roller, and thus heat wrinkles may be formed. However, if the dynamic friction coefficient of the surface of the first acrylic resin original member 1 facing away from the pattern layer 2 is within the above numerical range, the decorative sheet 11 is conveyed onto the turning roller smoothly, and thus heat wrinkles are less likely to be formed. If the dynamic friction coefficient of the surface of the first acrylic resin original member 1 facing away from the pattern layer 2 is less than the above numerical range, the decorative sheet 11 slides too much on the turning roller, and thus thermal lamination tends to be difficult.

SECOND EXAMPLES

Example 2-1

Example 2-1 performed by the present inventor will be described. In Example 2-1, a back-printed decorative sheet 11 was produced in the same manner as in the above embodiment, and a decorative material 22 was further produced using the decorative sheet 11. As shown in Table 4, the decorative sheet 11 was produced by sequentially applying a pattern layer 2, an adhesive layer 6, and an anchor layer 3 to a first surface of a first acrylic resin original member 1, and then bonding a second acrylic resin original member 7 thereto by dry lamination.

In this example, the pattern layer 2 was formed using a urethane/vinyl chloride-vinyl acetate ink. The adhesive layer 6 was formed using a material containing a urethane resin and a curing agent therefor (IPDI). The curing agent (IPDI) was added in an amount of 10 parts by mass relative to 100 parts by mass of the urethane resin.

In the production of the decorative sheet 11, original members made of an ethylene-methyl methacrylate copolymer resin (EMAA) were used as the first acrylic resin original member 1 and the second acrylic resin original member 7. Further, the anchor layer 3 was formed by applying an anchor layer-forming ink containing a polyurethane resin. The anchor layer-forming ink of Example 2-1 does not contain a curing agent.

Then, the produced back-printed decorative sheet 11 was arranged between a clear substrate 4 as the upper base and a colored substrate 5 as the lower base so that the first acrylic resin original member 1 faced towards the clear substrate 4 and the second acrylic resin original member 7 faced towards the colored substrate 5.

Lastly, the laminate was thermally laminated to form a decorative material according to Example 2-1. The conditions for thermal lamination are as follows.

Temperature of upper part of heating bar: 145° C.
Temperature of lower part of heating bar: 145° C.
Pressing time: 120 seconds
Pressure: 3 kgf/cm$^2$ The dynamic friction coefficient of the surface of the first acrylic resin original member 1 facing away from the printing surface (the surface on which the pattern layer was formed) was 0.4, which was measured according to JIS K 7125.

Example 2-2

A decorative material according to Example 2-2 was formed in the same manner as in Example 2-1, except that the adhesive layer 6 was formed using a material containing an acrylic resin and a curing agent therefor, and the anchor layer 3 was formed by applying an anchor layer-forming ink containing an acrylic resin. The curing agent was added in an amount of 10 parts by mass relative to 100 parts by mass of the acrylic resin.

Example 2-3

A decorative material according to Example 2-3 was formed in the same manner as in Example 2-1, except that the anchor layer 3 was formed by applying an anchor layer-forming ink containing an acrylic resin.

Example 2-4

A decorative material according to Example 2-4 was formed in the same manner as in Example 2-1, except for using a first acrylic resin original member 1 in which a surface facing away from a printing surface (surface on which a pattern layer 2 was formed) of the original member had a dynamic friction coefficient of 1.0, which was measured according to JIS K 7125.

Example 2-5

A decorative material according to Example 2-5 was formed in the same manner as in Example 2-1, except for using a first acrylic resin original member 1 in which a surface facing away from a printing surface (surface on which a pattern layer 2 was formed) of the original member had a dynamic friction coefficient of 0.5, which was measured according to JIS K 7125.

Example 2-6

A decorative material according to Example 2-6 was formed in the same manner as in Example 2-1, except for using a first acrylic resin original member 1 in which a surface facing away from a printing surface (surface on which a pattern layer 2 was formed) of the original member had a dynamic friction coefficient of 1.5, which was measured according to JIS K 7125.

Comparative Example 2-1

Further, in Example 2-1, a decorative sheet was produced as a comparison by applying a pattern layer-forming ink containing an acrylic resin as a binder to a first surface of an acrylic resin original member to form a pattern layer. A decorative material was produced using this decorative sheet in the same manner as in Example 2-1 (Comparative Example 2-1).

The acrylic resin original members used in Comparative Example 2-1 were the same as the first acrylic resin original member 1 and the second acrylic resin original member 7 in Example 2-1. The pattern layer was formed by applying a pattern layer-forming ink containing an ethylene-methyl methacrylate copolymer resin (EMAA) as a binder to the acrylic resin original member. The pattern layer-forming ink of Comparative Example 2-1 does not contain a curing agent.

Further, the production conditions for the decorative material were the same as those in Example 2-1, except for the difference in the decorative sheet.

<Performance Evaluation>

The following performance evaluation was conducted on the decorative materials of Examples 2-1 to 2-6 and the decorative material of Comparative Example 2-1.

Substrate Adhesion Evaluation

The above decorative materials were each evaluated for the degree of adhesion between each of the above decorative sheets and the clear substrate as the upper base or the colored substrate as the lower base. The evaluation method and evaluation criteria are as follows.

[Evaluation Method]

After cooling each of the decorative materials formed by thermal lamination according to the method described in Example 2-1, the decorative sheet and the clear substrate as the upper base or the colored substrate as the lower base were peeled off from each other to evaluate the adhesion of the decorative materials.

(Evaluation Criteria)

Excellent: No peeling of the substrate was observed, and there was no problem in use.

Poor: Peeling of the substrate was observed, and there was a problem in use.

Air Entrainment Evaluation

The above decorative materials were each evaluated for air entrainment occurring between each of the above decorative sheets and the clear substrate as the upper base or the colored substrate as the lower base. The evaluation method and evaluation criteria are as follows.

[Evaluation Method]

After cooling each of the decorative materials formed by thermal lamination according to the method described in Example 2-1, the appearance of each decorative material was visually observed to confirm the presence or absence of air entrainment.

(Evaluation Criteria)

Excellent: No air entrainment was observed, and there was no problem in use.

[Evaluation Criteria]

Good: 25 or more out of 50 people determined that "there was a matte appearance."

Fair: 24 or fewer out of 50 people determined that "there was a matte appearance."

When the matte appearance evaluation is "good" or "fair," there is no problem in use.

Table 4 shows the results.

TABLE 4

| Layer configuration | Example 2-1 | Example 2-2 | Example 2-3 | Example 2-4 | Example 2-5 | Example 2-6 | Comparative Example 2-1 |
|---|---|---|---|---|---|---|---|
| Original Member | Acrylic resin original member | Acrylic resin original member | Acrylic resin original member | Acrylic resin original member | Acrylic resin original member | Acrylic resin original member | Acrylic resin original member |
| Dynamic friction coefficient of original member | 0.4 | 0.4 | 0.4 | 1.0 | 0.5 | 1.5 | 0.4 |
| Pattern layer | Urethane/vinyl chloride-vinyl acetate ink | Urethane/vinyl chloride-vinyl acetate ink | Urethane/vinyl chloride-vinyl acetate ink | Urethane/vinyl chloride-vinyl acetate ink | Urethane/vinyl chloride-vinyl acetate ink | Urethane/vinyl chloride-vinyl acetate ink | Acrylic ink |
| Adhesive layer | Urethane resin + curing agent | Acrylic resin + curing agent | Urethane resin + curing agent | Urethane resin + curing agent | Urethane resin + curing agent | Urethane resin + curing agent | — |
| Anchor layer | Urethane resin | Acrylic resin | Acrylic resin | Urethane resin | Urethane resin | Urethane resin | — |
| Original Member | Acrylic resin original member | Acrylic resin original member | Acrylic resin original member | Acrylic resin original member | Acrylic resin original member | Acrylic resin original member | — |
| Substrate adhesion evaluation | Good | Excellent | Excellent | Excellent | Excellent | Excellent | Poor |
| Air entrainment evaluation | Good | Excellent | Excellent | Excellent | Excellent | Excellent | Poor |
| Heat wrinkle evaluation | Fair | Fair | Fair | Good | Good | Good | Fair |
| Matte appearance evaluation | Fair | Fair | Fair | Good | Good | Good | Fair |

Poor: Air entrainment was observed, and there was a problem in use.

Heat Wrinkle Evaluation

The above decorative materials were each evaluated for heat wrinkles in each decorative sheet. The evaluation method and evaluation criteria are as follows.

[Evaluation Method]

After cooling each of the decorative materials formed by thermal lamination according to the method described in Example 2-1, the appearance of each decorative material was visually observed to confirm the presence or absence of heat wrinkles.

[Evaluation Criteria]

Good: No heat wrinkles were observed, and there was no problem in use.

Fair: There was no problem in use, but slight heat wrinkles were observed.

When the heat wrinkle evaluation is "good" or "fair," there is no problem in use.

Matte Appearance Evaluation

The above decorative materials were each evaluated for the matte appearance of each decorative sheet. The evaluation method and evaluation criteria are as follows.

[Evaluation Method]

After cooling each of the decorative materials formed by thermal lamination according to the method described in Example 2-1, the appearance of each decorative material was visually observed to confirm the presence or absence of a matte appearance.

(Evaluation Results)

As shown in Table 4, in Examples 2-1 to 2-3, the substrate adhesion evaluation and the air entrainment evaluation were both improved as compared with Comparative Example 2-1. This confirmed that with the decorative sheet 11 according to the above embodiment, the adhesion between the decorative sheet 11 and the substrates (the clear substrate 4 as the upper base and the colored substrate 5 as the lower base) was increased, and the occurrence of air entrainment was reduced which led to improvement in appearance defects.

The results of Examples 2-4 to 2-6 revealed that the formation of heat wrinkles could be prevented when the dynamic friction coefficient of the surface of the first acrylic resin original member 1 facing away from the printing surface (the surface on which the pattern layer 2 was formed) was within a range of 0.5 or more and 1.5 or less, which was measured according to JIS K 7125.

Further, the results of Examples 2-4 to 2-6 revealed that a matte appearance could be imparted to the decorative sheet 11 when the dynamic friction coefficient of the surface of the first acrylic resin original member 1 facing away from the printing surface (the surface on which the pattern layer 2 was formed) was within a range of 0.5 or more and 1.5 or less, which was measured according to JIS K 7125.

As a matter of course, the present invention may be in a form in which the configuration described in the first embodiment and the configuration described in the second embodiment are selectively combined. Even in that case, the above-described effects are obtained.

INDUSTRIAL APPLICABILITY

The decorative sheet, decorative material, and method for producing the same according to the present invention can be used for surface decoration for use in interior decoration of the floors, walls, and ceilings of buildings, surface decoration materials for furniture and various cabinets, surface decoration of fittings, vehicle interiors, and the like.

REFERENCE SIGNS LIST

1 . . . Acrylic resin original member (first acrylic resin original member); 2 . . . Pattern layer; 3 . . . Anchor layer; 4 . . . Clear substrate; 5 . . . Colored substrate; 6 . . . Adhesive layer; 7 . . . Second acrylic resin original member; 10 . . . Decorative sheet; 11 . . . Decorative sheet; 20 . . . Decorative material; 21 . . . Decorative material; 22 . . . Decorative material.

What is claimed is:

1. A decorative sheet, comprising:
a first acrylic resin original member made of a first acrylic resin,
a pattern layer in a direct physical contact with the first acrylic resin original member, the pattern layer contains a mixture of polyurethane and vinyl chloride-vinyl acetate copolymer as a binder, the pattern layer being on a first surface of the first acrylic resin original member, the first surface of the first acrylic resin original member is a continuous flat surface,
an adhesive layer in a direct physical contact with the pattern layer, the adhesive layer contains urethane resin and a curing agent, the adhesive layer being on a first surface of the pattern layer, which surface faces away from the first acrylic resin original member,
an anchor layer in a direct physical contact with the adhesive layer, the anchor layer contains urethane resin, the anchor layer being on a first surface of the adhesive layer, which surface faces away from the pattern layer, the first surface of the adhesive layer is a continuous flat surface, and
a second acrylic resin original member made of a second acrylic resin, the second acrylic resin original member being in a direct physical contact with a first surface of the anchor layer, which surface faces away from the adhesive layer, the first surface of the anchor layer is a continuous flat surface, wherein a dynamic friction coefficient of a second surface of the first acrylic resin original member measured according to JIS K 7125 is in a range 0.5 or more and 1.5 or less, the second surface of the first acrylic resin original member being opposite to the first surface of the first acrylic resin original member, the second surface of the first acrylic resin original member is a continuous flat surface, and the first acrylic resin is selected from the group consisting of an ethylene-methyl acrylate copolymer resin, an ethylene-ethyl acrylate copolymer resin, an ethylene-methacrylic acid copolymer resin, and an ethylene-acrylic acid copolymer resin, and wherein the anchor layer is formed by depositing an ink comprising a non-acrylic urethane resin, wherein the non-acrylic urethane resin is the only resin in the anchor layer.

2. The decorative sheet of claim 1, wherein
the pattern layer further contains an urethane curing agent, and,
a mixing ratio, which is a mass ratio of the mixture to the urethane curing agent, is 100/3.

3. The decorative sheet of claim 1, wherein the dynamic friction coefficient of the second surface of the first acrylic resin original member measured according to JIS K 7125 is within a range of 1.0 or more and 1.5 or less.

4. The decorative sheet of claim 1, wherein the anchor layer does not contain a curing agent.

5. The decorative sheet of claim 1 consisting of the first acrylic resin original member, the pattern layer, the adhesive layer, the anchor layer, and the second acrylic resin original member.

6. The decorative sheet of claim 1, wherein the first acrylic resin is an ethylene-methacrylic acid copolymer resin.

7. A decorative sheet, comprising:
a first acrylic resin original member made of a first acrylic resin,
a pattern layer in a direct physical contact with the first acrylic resin original member, the pattern layer contains a mixture of polyurethane and vinyl chloride-vinyl acetate copolymer as a binder, the pattern layer being on a first surface of the first acrylic resin original member, the first surface of the first acrylic resin original member is a continuous flat surface,
an adhesive layer in a direct physical contact with the pattern layer, the adhesive layer contains urethane resin and a curing agent, the adhesive layer being on a first surface of the pattern layer, which surface faces away from the first acrylic resin original member,
an anchor layer in a direct physical contact with the adhesive layer, the anchor layer contains urethane resin, the anchor layer being on a first surface of the adhesive layer, which surface faces away from the pattern layer, the first surface of the adhesive layer is a continuous flat surface, and,
a second acrylic resin original member made of a second acrylic resin, the second acrylic resin original member being in a direct physical contact with a first surface of the anchor layer, which surface faces away from the adhesive layer, the first surface of the anchor layer is a continuous flat surface, wherein a dynamic friction coefficient of a second surface of the first acrylic resin original member measured according to JIS K 7125 is in a range 0.5 or more and 1.5 or less, the second surface of the first acrylic resin original member being opposite to the first surface of the first acrylic resin original member, the second surface of the first acrylic resin original member is a continuous flat surface, and the first acrylic resin is selected from the group consisting of an ethylene-methyl acrylate copolymer resin, an ethylene-ethyl acrylate copolymer resin, an ethylene-methacrylic acid copolymer resin, and an ethylene-acrylic acid copolymer resin, and wherein the anchor layer does not contain a curing agent.

8. The decorative sheet of claim 7, wherein
the pattern layer further contains an urethane curing agent, and,
a mixing ratio, which is a mass ratio of the mixture to the urethane curing agent, is 100/3.

9. The decorative sheet of claim 7, wherein the dynamic friction coefficient of the second surface of the first acrylic resin original member measured according to JIS K 7125 is within a range of 1.0 or more and 1.5 or less.

10. The decorative sheet of claim 7 consisting of the first acrylic resin original member, the pattern layer, the adhesive layer, the anchor layer, and the second acrylic resin original member.

11. The decorative sheet of claim 7, wherein the first acrylic resin is an ethylene-methacrylic acid copolymer resin.

* * * * *